Dec. 12, 1950 J. V. OLIVEAU 2,533,281
BEVERAGE DISPENSING DEVICE
Filed Aug. 19, 1946 2 Sheets-Sheet 1
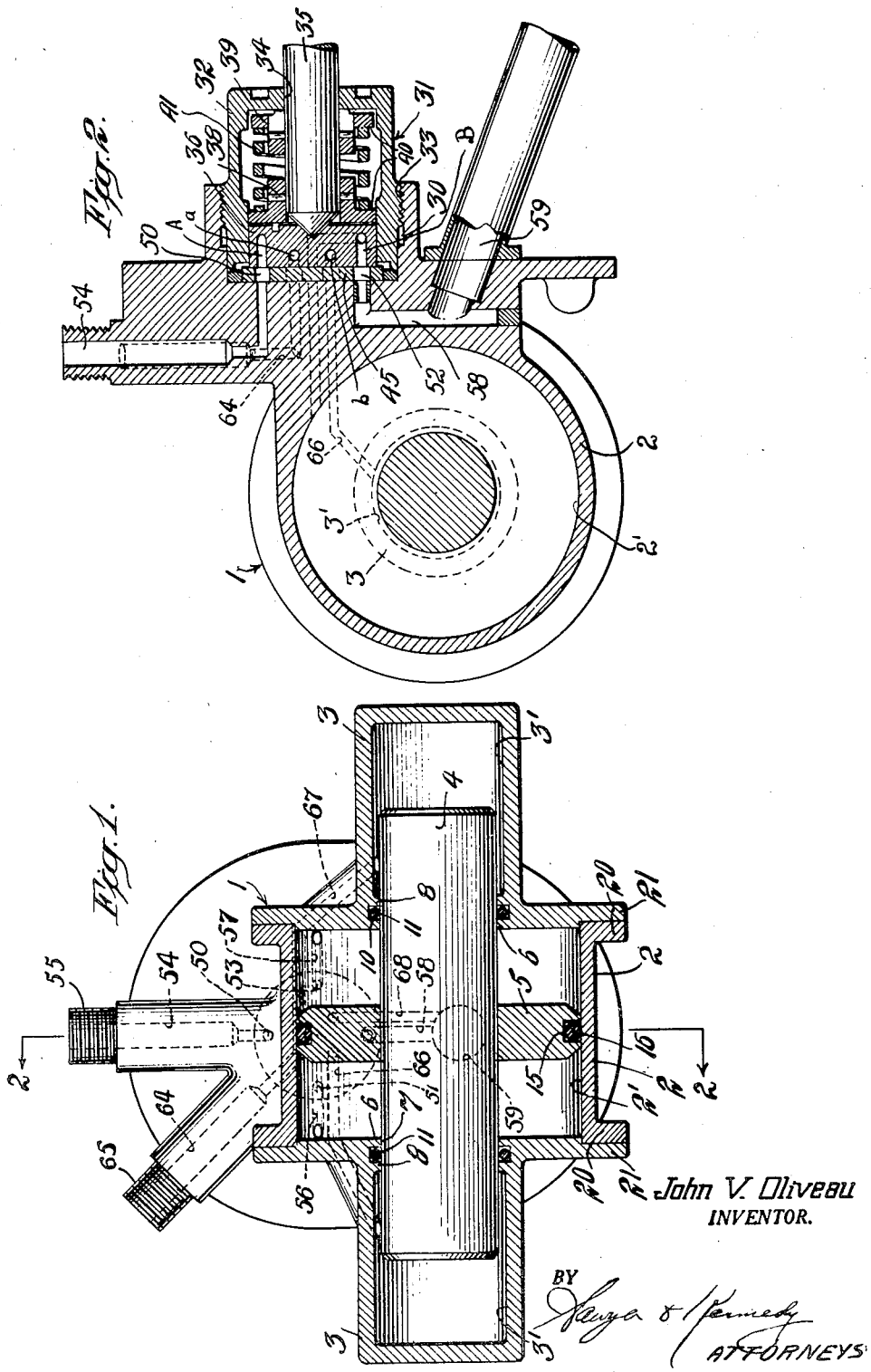
John V. Oliveau
INVENTOR.

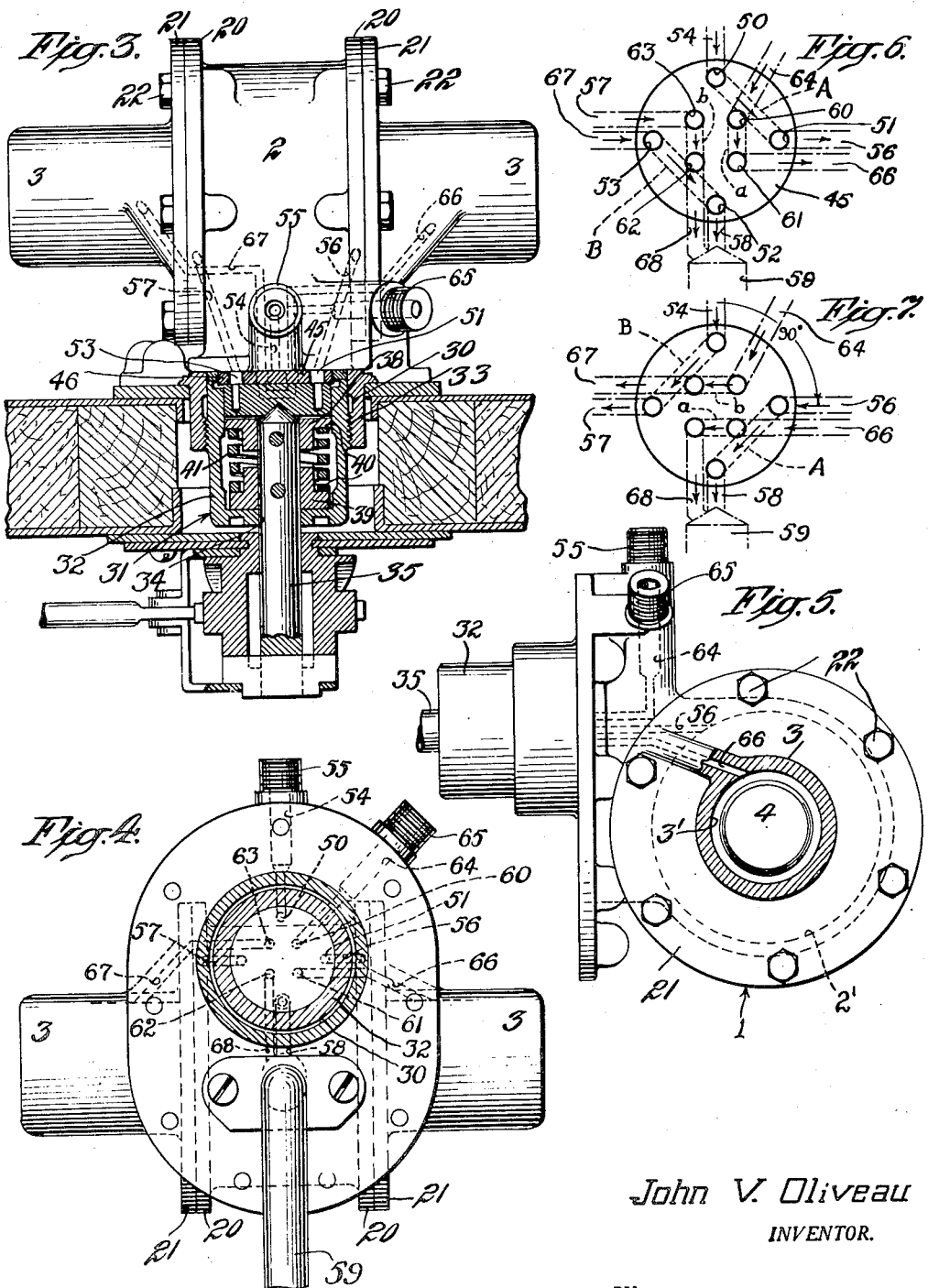

Patented Dec. 12, 1950

2,533,281

UNITED STATES PATENT OFFICE 2,533,281

BEVERAGE DISPENSING DEVICE

John V. Oliveau, Mineola, N. Y., assignor, by mesne assignments, to Cleveland-Detroit Corporation, a corporation of Delaware Application August 19, 1946, Serial No. 691,552

20 Claims. (Cl. 225—21)

The present invention relates to a liquid dispensing device and more particularly to mechanisms for measuring and mixing predetermined quantities of liquids, such as syrup and carbonated water, for use in a beverage dispensing device of the automatic type.

In machines of the type mentioned, suitable reservoirs of syrup are provided, as well as a supply of carbonated water under pressure, and for the purpose of vending the desired beverage a predetermined quantity of each must be measured out, mixed and dispensed in cups for delivery to the customer. Various mechanisms have been designed for measuring and dispensing and it is the object of the present invention to provide such a mechanism, which will accurately measure the two liquids before delivering them to a mixing and dispensing passage, and which is simple in operation and construction.

A further object is to provide a simple, compact mechanism which will perform one complete operation as above described upon each single actuation thereof, and which may be operated through the medium of the pressure of the carbonated water, the water being delivered to the dispensing device prior to carbonation, or by mechanical means.

Another object is to provide such a mechanism which may be housed in a single body, having all necessary flow passages and operating parts embodied in a single housing, obviating the necessity for a multiplicity of extraneous tubes or piping.

A further object of the invention is to provide a cylinder dispensing mechanism in which variation in the quantity and proportions of ingredients is reduced to a minimum.

The present invention is an improvement over that disclosed in Waite et al. application Serial No. 460,942, filed October 6, 1942, now Patent No. 2,427,429 of Sept. 16, 1947, for Liquid Dispensing Apparatus. In the present disclosure, a valve structure similar to that of the Waite et al. application is associated with a cylinder unit of improved type, which eliminates a number of joints forming possible points of leakage and also simplifies the construction considerably.

With these and other objects in view, as may appear from the accompanying specification, the invention consists in the combinations of parts, features of construction and details of construction, which will be first described in connection with the accompanying drawing, showing an apparatus embodying the invention in a preferred form, and the features forming the invention will then be specifically pointed out in the claims.

In the drawing:

Figure 1 is an axial vertical section through the cylinder housing of a device embodying the present invention in a preferred form and is taken on the line 1—1 of Figure 2;

Figure 2 is a section on the line 2—2 of Figure 1;

Figure 3 is a plan view, with the valve structure in section, on the line 3—3 of Figure 1, and showing the relation of the valve structure with the cylinder housing illustrated in Figures 1 and 2;

Figure 4 is a view on the line 4—4 of Figure 3;

Figure 5 is a view on the line 5—5 of Figure 1;

Figure 6 is a diagrammatic view showing the valve structure and its associated passages; and Figure 7 is a diagrammatic view similar to Figure 6 with the valve rotated 90°.

Referring to the drawing and particularly to Figures 1 and 3 thereof, the device of the present invention comprises a measuring cylinder unit 1 having a central section 2 for measuring and dispensing carbonated water, and end sections 3 for measuring and dispensing syrup. Each of these cylinder elements may be formed conveniently as a single casting, the central unit having a bore 2' and the end units being hollow so as to provide cylinder spaces 3'. A plunger or piston member 4 reciprocates back and forth within the cylinder unit and has fixed at its middle a piston 5 which cooperates with the cylinder bore 2'. Inward projections 6 and 8 are formed on the end castings 3 at both sides of annular grooves 10, which receive sealing rings 11 made of rubber or synthetic rubber. These rings are water-lubricated by the materials dispensed, and for reasons later pointed out, such type of seal is entirely adequate. The piston 5 likewise has a peripheral groove 15 accommodating a similar sealing ring 16. The three castings forming the cylinder unit are attached to each other by means of the flanges 20, 21, having cooperating finished surfaces which are held together as by means of bolts 22 and sealed by gaskets or in any other convenient way.

If carbonated water under pressure is admitted to the central cylinder 2 at either side of the piston 5, it will drive the piston and plunger to the other side, filling the central cylinder with carbonated water on one side of the piston and discharging carbonated water from the other. At the same time, one of the syrup cylinders 3 will discharge syrup and the other will fill with syrup. By controlling the admission and discharge of carbonated water to reciprocate the plunger back and forth, an accurate displacement type of measuring and dispensing unit is provided. It should be noted that the construction disclosed herein eliminates variation in the quantity dispensed and in the proportion of ingredients which may be present due to the piston rod displacement in devices of the character disclosed in the Waite et al. application, above referred to.

Sealing rings of synthetic rubber or like suitable material, known as "O-rings" are employed for sealing the connection between the pistons or plungers and their cooperating surfaces. These sealing devices need no lubrication other than that provided by the water being handled by the cylinders and water content of the syrup. The amount of syrup which will pass the seal around the plunger is so small as to be negligible and will not amount to more than a drop or two of the many hundreds or thousands of operations. However, any tendency which might exist over a long period of operation for a film of syrup to accumulate dry upon the walls of the bore is eliminated entirely by the carbonated water, which washes the plunger at the opposite side of the seal at each operation.

A valve such as shown in the above mentioned Waite et al. application is provided for controlling the action of the cylinders. The valve is shown herein in some detail for completeness of disclosure, but forms, in itself, no part of the present invention, it being apparent that other forms of valve may be utilized without departing from the invention in its broader aspects.

The valve structure which controls the operation of the cylinder mechanism is accommodated with an opening 30 forming the central casting 2. The valve 31, which is the same as that of the Waite et al. application above referred to, will be described herein only to the extent necessary to disclose clearly its cooperation with the cylinder mechanism.

Valve 31 includes a housing 32 which is fastened within the opening 30 as by means of the cooperating threads 33. An opening 34 in the valve housing 32 accommodates the valve operating shaft 35, by means of which the movable valve member 36 is rotated. The valve 36 is coupled to the shaft 35 for rotation thereby by means of a pin rotatably connecting the valve 36 to a member 38, which in turn is fastened to the shaft 35 by a pin as shown. A second member 39 carried rotatably by the shaft 35 serves to transmit the thrust of a spring 41 to the end of the valve housing 32, the pressure of this spring against the flanges 40 and members 38 and 39 serving to press valve 36 against the valve seat packing 45. This packing is of threaded leather or other suitable material and contains apertures which are registered with and serve as extensions of the ports in the valve seat 46 formed on the casting 2. As in the Waite et al. application above described, the dispensing cylinders are operated by turning the valve by means of the shaft 35 in 90° steps, one complete dispensing operation being performed for each such rotation. As shown in Figures 1 to 4, the valve seat is provided with inner and outer sets of ports for handling carbonated water and syrup respectively. The outer set of ports comprises ports 50, 51, 52 and 53. The port 50 is connected through a passage 54 formed in the casting 2 to fitting 55, which serves for attaching the carbonated water supply pipe. Port 51 and port 53 are connected through bores 56 and 57 formed in the casting 2 to the two ends of the carbonated water cylinder space 2', port 52 is connected through a bore 58 in the casting 2 to the discharge outlet 59. The inner set of ports 60, 61, 62 and 63 are similarly arranged to handle the syrup. The port 60 is connected through a passage 64 in the casting 2 to a fitting 65 to which the syrup supply pipe is connected. Ports 61 and 63 are connected to the two syrup cylinders 3 through bores 66 and 67 formed within the castings 2 and 3. The port 62 is connected by a bore 68 within the casting 2 to the discharge outlet previously referred to.

The valve member 36 is provided with similar ports and with internal bores connecting them in pairs, the bores A and B connecting carbonated water ports and the bores $a$ and $b$ connecting syrup ports. Figures 6 and 7 illustrate diagrammatically the action of this valve mechanism. Assuming the valve position of Figure 6, liquid flow will occur in the directions indicated by the arrows: carbonated water from passage 54 will be carried from port 50 through the valve body bore A to port 51 and thence through passage 56 so as to fill the carbon dioxide cylinder to the right of the piston (Figures 1 and 3), thus forcing the piston to the left. The carbonated water to the left of the piston will be discharged through passage 57, port 53, valve body passage B, port 52 and passage 58 into the discharge outlet 59. At the same time syrup will be discharged from a cylinder 3 through passage 67, port 63, valve body passage $b$, port 62 and passage 68, so that it is mixed with the carbonated water in the exhaust opening 59 to form the beverage. At the same time, the other syrup cylinder 3 is filled through passage 64, port 60, valve body passage A, port 61, passage 66. Each reciprocation of the piston exhausts the carbonated water and syrup from one end of the cylinder structure and fills the cylinders with syrup and carbonated water at the opposite end. The next operation takes place in the reverse direction, exhausting the filled cylinders and refilling the empty ones. This operation is effected by turning the valve through 90° into the position of Figure 7, establishing paths of flow as indicated by the arrows, which are identical with those just described, except that the action is reversed, left for right. A further rotation through 90° restores the conditions shown in Figure 6.

In dispensing units employing this device, it may be desired to immerse the latter in a cooling bath or chilling tank, filled with brine, chilled water or like suitable coolant, thus keeping the syrup and carbonated water chilled until the moment it is dispensed. The present construction is particularly adaptable for such installation, the liquid passages being internal. As shown in Figure 3, the valve receiving socket 30 may be open to permit cooperation with a valve structure, while all other parts are within a cooling tank. By eliminating all tubing and connections, other than those for the supply of liquid to the device, possibility of leaks is reduced to a minimum. Such leaks would allow the cooling fluid in which the device was immersed to enter the unit, diluting or polluting the beverage dispensed, or allow the syrup and carbonated water to seep into the immersion tank where it would accumulate to create an unhygienic condition.

What is claimed is:

1. A measuring cylinder unit for mixed beverage dispensing machines comprising a housing having walls forming aligned syrup cylinders spaced apart from each other by a water cylinder therebetween, composite piston means reciprocable within said cylinders, water lubricated sealing means between said piston means and said syrup cylinders, the said sealing means separating the water and syrup cylinder spaces, a valve structure for simultaneously filling the syrup and water cylinders to one side of the said piston means and for simultaneously discharging the liquids from the syrup and water cylinders to the other side of said piston means, and internal passages formed entirely within the said housing walls of drilled holes for connecting the said cylinder spaces with the said valve structure.

2. A measuring cylinder unit for mixed beverage dispensing machines comprising a housing having walls forming a central water cylinder and an aligned syrup cylinder at each end thereof, a syrup plunger reciprocable within said cylinders, a piston carried by said plunger for reciprocation therewith in the water cylinder, water lubricated sealing means between said plunger and said syrup cylinders, and means for simultaneously filling a syrup cylinder and the end of the water cylinder adjacent thereto and discharging the other end of the water cylinder and the syrup cylinder adjacent thereto.

3. A measuring cylinder unit for mixed beverage dispensing machines comprising a housing having walls forming a central water cylinder and an aligned syrup cylinder at each end thereof, a syrup plunger reciprocable within said cylinders, a piston carried by said plunger for reciprocation therewith in the water cylinder, and water lubricated sealing means between said plunger and said syrup cylinders, the said cylinder unit having a valve seat formed therein and internal passages within its walls connecting the syrup cylinders and the two ends of the water cylinder with said valve seat for simultaneously filling a syrup cylinder and the end of the water cylinder adjacent thereto and discharging the other end of the water cylinder and the syrup cylinder adjacent thereto.

4. A measuring cylinder unit for mixed beverage dispensing machines comprising a housing having walls forming spaced aligned syrup cylinders and a water cylinder therebetween, a water piston reciprocable within said water cylinder and separating the ends thereof, syrup piston means fixed to said water piston for reciprocation therewith, water lubricated sealing means between said syrup piston means and said syrup cylinder for separating adjacent water and syrup cylinder spaces, means for simultaneously filling the syrup and water cylinder spaces to one side of said piston by moving the latter in one direction, and means for introducing water under pressure into the opposite end of said water cylinder to drive the said piston in the opposite direction for filling the other syrup cylinder and simultaneously discharging liquids from the said first spaces.

5. A measuring cylinder unit for mixed beverage dispensing machines comprising a housing having walls forming an open-ended water cylinder, cylinder heads secured to each end of said cylinder and each having a syrup cylinder formed therein, a syrup plunger reciprocable within said cylinders, a piston carried by said plunger for reciprocation therewith in the water cylinder and separating the ends thereof, water lubricated sealing means between said plunger and said syrup cylinders, a valve seat formed in said housing in lateral alignment with said water cylinder, internal passages within said walls connecting the syrup and water cylinders with said valve seat, and means including a valve member cooperating with said seat for simultaneously filling the syrup and water cylinders to one side of the said piston by moving the latter in one direction and means for introducing water under pressure into the opposite end of said water cylinder to drive said piston in the opposite direction for filling the other syrup cylinder and for simultaneously discharging the liquids from said cylinders to the other side of said piston.

6. A measuring cylinder unit for mixed beverage dispensing machines comprising a housing having walls forming a central water cylinder and an aligned syrup cylinder at each end thereof, a syrup plunger reciprocable within said cylinders, a piston carried by said plunger for reciprocation therewith in the water cylinder, water lubricated sealing means between said plunger and said syrup cylinders, whereby movement of said piston and plunger in either direction fills the syrup and water cylinder at one end of said unit and discharges the syrup and water cylinder at the other end thereof, and means for introducing water into either end of said water cylinder for driving said piston and plunger in either direction.

7. A measuring cylinder unit for mixed beverage dispensing machines comprising a housing having walls forming a central water cylinder and an aligned syrup cylinder at each end thereof, a syrup plunger reciprocable within said cylinders, a piston carried by said plunger for reciprocation therewith in the water cylinder, water lubricated sealing means between said plunger and said syrup cylinders, the said cylinder unit having a valve seat formed therein and internal passages within its walls connecting the syrup cylinders and the two ends of the water cylinder with said valve seat for simultaneously filling a syrup cylinder and the end of the water cylinder adjacent thereto and discharging the other end of the water cylinder and the syrup cylinder adjacent thereto, and valve means cooperating with said valve seat for introducing water into either end of said water cylinder to drive said piston and plunger in either direction.

8. A measuring cylinder unit for mixed beverage dispensing machines comprising a housing having walls forming a central water cylinder and an aligned syrup cylinder at each end thereof, a syrup plunger reciprocable within said cylinders, a piston carried by said plunger for reciprocation therewith in the water cylinder, water lubricated sealing means between said plunger and said syrup cylinders, means embodied in said housing for receiving a valve structure, and internal passages within the walls of said cylinder unit connecting the syrup cylinders and the two ends of the water cylinder with said valve receiving means for simultaneously filling a syrup cylinder and the end of the water cylinder adjacent thereto and discharging the other end of the water cylinder and the syrup cylinder adjacent thereto.

9. In a measuring cylinder unit of the class described, and in combination, a first cylinder, a cylinder head therefor having an axial boss extending therefrom, a second cylinder formed in said boss in alignment with said first cylinder, means embodied in said unit for receiving a valve structure in lateral alignment with said first cylinder, and a passage connected to said valve receiving means for filling and emptying said second cylinder comprising a section within the first cylinder body and a registered section within the second cylinder body opening into the side wall of the bore thereof.

10. A measuring cylinder unit for mixed beverage dispensing machines comprising a housing having walls forming aligned array of syrup cylinder spaced apart from each other with a water cylinder in the space between them, composite piston means reciprocable within said cylinders, water-lubricated sealing means between said piston means and said syrup cylinders for separating the water and syrup cylinder spaces, means embodied in said housing walls for receiving a valve structure therein in lateral alignment with said water cylinder, and means including a valve structure for simultaneously filling the syrup and water cylinders to either side of the said sealing means and for simultaneously discharging the liquids therefrom, and passages formed entirely within the said housing walls for connecting the said cylinder spaces with said valve structure receiving means.

11. A measuring cylinder unit for mixed beverage dispensing machines comprising a housing having walls forming a central water cylinder and an aligned syrup cylinder at each end thereof, a water piston reciprocable within said water cylinder and separating the ends thereof, syrup piston means fixed to said water piston for reciprocation therewith, water-lubricated sealing means between said syrup piston means and said syrup cylinder, the said sealing means separating adjacent water and syrup cylinder spaces, whereby movement of said water and syrup pistons in either direction fills the syrup and water cylinder at one end of said unit and discharges the syrup and water cylinder at the other end thereof, and means for introducing water into either end of said water cylinder for driving said piston and plunger in either direction.

12. A measuring cylinder unit for mixed beverage dispensing machines comprising a housing having walls forming a central water cylinder and an aligned syrup cylinder at each end thereof, a water piston reciprocable within said water cylinder and separating the ends thereof, syrup piston means fixed to said water piston for reciprocation therewith, water lubricated sealing means between said syrup piston means and said syrup cylinder, the said sealing means separating adjacent water and syrup cylinder spaces, and valve receiving means formed in said housing, internal passages formed within the walls of said housing connecting the syrup cylinders and the two ends of the water cylinder to said valve receiving means for simultaneously filling a syrup cylinder and the end of the water cylinder adjacent thereto and discharging the other end of the water cylinder and the adjacent syrup cylinder.

13. A measuring cylinder unit for mixed beverage dispensing machines comprising a housing having walls forming a central water cylinder and an aligned syrup cylinder at each end thereof, a water piston reciprocable within said water cylinder and separating the ends thereof, syrup piston means fixed to said water piston for reciprocation therewith, water lubricated sealing means between said syrup piston means and said syrup cylinder, the said sealing means separating adjacent water and syrup cylinder spaces, and valve receiving means formed in said housing, internal passages formed within the walls of said housing connecting the syrup cylinders and the two ends of the water cylinder to said valve receiving means for simultaneously filling a syrup cylinder and the end of the water cylinder adjacent thereto and discharging the other end of the water cylinder and the adjacent syrup cylinder and valve means cooperating with said valve receiving means for introducing water into either end of said water cylinder to drive said pistons in either direction.

14. A measuring cylinder unit for mixed beverage dispensing machines comprising, a water cylinder having a piston therein, a syrup cylinder on each end of said water cylinder and in axial alignment therewith, a piston rod extending through said piston and keyed thereto, said piston rod having its extended ends forming pistons for said syrup cylinder, water lubricated sealing means between said extended ends and said syrup cylinder for separating the interiors of the water and the syrup cylinders, and means for simultaneously filling both the space in said water cylinder to one side of said piston and its neighboring syrup cylinder and for simultaeously discharging the liquids from said water cylinder to the other side of said piston and its neighboring syrup cylinder.

15. A measuring cylinder unit for mixed beverage dispensing machines comprising, a housing having walls forming aligned syrup cylinders spaced apart by a water cylinder therebetween, composite piston means reciprocable within said cylinders and comprised of a double faced piston in said water cylinder and a piston rod therein extending oppositely therefrom into said syrup cylinders and movable with said piston, water lubricated sealing means between said piston means and the walls of said cylinders for separating the water and syrup cylinder spaces, a valve seat formed on said housing, a plurality of internal fluid passages formed entirely within said wall for connecting the cylinder spaces to said valve seat, and means including a valve member cooperating with said valve seat for simultaneously effecting the filling of the water cylinder to one side of said double faced piston and its adjacent syrup cylinder, and for simultaneously discharging the liquids from the space in said water cylinder on the opposite side of said double faced piston and its adjacent syrup cylinder.

16. A measuring cylinder unit for mixed beverage dispensing machines comprising, a housing having walls forming spaced apart aligned syrup cylinders with a double acting water cylinder therebetween, a syrup plunger reciprocable within said cylinders, a double faced piston carried by said plunger intermediate the ends thereof for reciprocation therewith in the water cylinder, sealing means contacting said plunger and separating the interiors of said syrup cylinders from the interior of the water cylinder, a valve seat formed in said housing, a plurality of internal passages within the walls of said housing connecting the syrup and water cylinders with said valve seat, and means including a valve on said seat for simultaneously filling the syrup and water cylinder spaces to one side of said piston and for simultaneously discharging the liquids from the syrup and water cylinder spaces to the opposite side of said piston.

17. A measuring cylinder unit for mixed beverage dispensing machines comprising, a housing having walls forming aligned single acting syrup cylinders and a double acting water cylinder therebetween, a syrup plunger reciprocable within said cylinders, a piston secured on said plunger intermediate the ends thereof for reciprocation therewith in the water cylinder, sealing means between said plunger and said syrup cylinders for isolating the interiors thereof from the interior of said water cylinder, and means for simultaneously filling a syrup cylinder and the end of the water cylinder adjacent thereto and discharging the other end of the water cylinder and the syrup cylinder adjacent to it.

18. A measuring cylinder unit for mixed beverage dispensing machines comprising, a housing having walls forming an open-ended water cylinder, a water piston reciprocable within said water cylinder and separating the ends thereof, heads mounted on each end of said cylinder and each having formed therein a syrup cylinder, syrup piston means for said syrup cylinders fixed to said water piston for reciprocation therewith, water lubricated sealing means engaging said syrup piston means for separating adjacent water and syrup cylinder spaces, and means for simultaneously filling a syrup cylinder and the end of the water cylinder adjacent thereto and discharging the other end of the water cylinder and the syrup cylinder adjacent to it.

19. In a measuring cylinder unit of the class described and in combination, a pair of syrup cylinders spaced apart from and in alignment with each other, a water cylinder occupying the space between said first cylinders and having an interior diameter greater than the interior diameters of said first cylinders, said water cylinder being double acting and comprising power means for creating a suction in one and then the other of said syrup cylinders, a composite piston adapted to reciprocate in said cylinders and comprised of a piston rod, the ends of which engage and operate in said first cylinders, and a larger double faced piston secured therein intermediate the ends thereof and forming a working fit in said water cylinder, whereby water under pressure delivered into said water cylinder to one side of said piston urges it toward the opposite end of said water cylinder and simultaneously urges the plunger outwardly in the adjacent syrup cylinder, thereby creating a suction therein for causing it to fill with syrup.

20. In a measuring cylinder unit of the class described and in combination, an array of cylinders comprised of a central open ended cylinder with a piston reciprocably mounted therein, a cylinder head on one end of said cylinder and having a boss thereon containing a syrup cylinder therein, a cylinder head secured to the other end of said water cylinder and also having a boss thereon containing a syrup cylinder, a plunger passing through said piston and secured thereto and having its ends reciprocably engaging said syrup cylinders.

JOHN V. OLIVEAU.

REFERENCES CITED

The following references are of record in the file of this patent:

UNITED STATES PATENTS

| Number | Name | Date |
| --- | --- | --- |
| 2,427,429 | Waite et al. | Sept. 16, 1947 |